United States Patent
Wilkins et al.

(10) Patent No.: US 9,653,233 B2
(45) Date of Patent: May 16, 2017

(54) ROTARY BATTERY SWITCH

(71) Applicant: Power Products, LLC, Menomonee Falls, WI (US)

(72) Inventors: Christopher Wilkins, Kaeo Northland (NZ); Jarrod D. Sagar, Auckland (NZ)

(73) Assignee: Power Products, LLC, Menomonee Falls, WI (US)

( * ) Notice: Subject to any disclaimer, the term of this patent is extended or adjusted under 35 U.S.C. 154(b) by 179 days.

(21) Appl. No.: 14/537,485

(22) Filed: Nov. 10, 2014

(65) Prior Publication Data
US 2015/0129398 A1 May 14, 2015

Related U.S. Application Data

(60) Provisional application No. 61/901,789, filed on Nov. 8, 2013.

(51) Int. Cl.
| | | |
|---|---|---|
| *H01H 19/50* | (2006.01) | |
| *H01H 3/38* | (2006.01) | |
| *H01H 19/58* | (2006.01) | |

(52) U.S. Cl.
CPC .............. *H01H 19/50* (2013.01); *H01H 3/38* (2013.01); *H01H 19/58* (2013.01)

(58) Field of Classification Search
CPC .......... H01H 3/38; H01H 19/58; H01H 19/50
USPC ... 200/11 J, 1 R, 11 R, 14, 11 A–11 TW, 18, 200/1 A, 564, 570–571, 336
See application file for complete search history.

(56) References Cited

U.S. PATENT DOCUMENTS

| | | | |
|---|---|---|---|
| 2,913,587 A | 11/1959 | Gebhard | |
| 4,246,453 A | 1/1981 | Marchese et al. | |
| 4,493,954 A * | 1/1985 | Kimmel | H01H 19/585 |
| | | | 200/11 A |
| 5,677,520 A * | 10/1997 | Schag | B60H 1/0065 |
| | | | 200/61.86 |
| 5,923,008 A | 7/1999 | Williams, Jr. | |
| 6,559,393 B2 | 5/2003 | Nishikawa | |

(Continued)

OTHER PUBLICATIONS

International Search Report and Written Opinion for PCT Application No. PCT/US2014/064822 dated Feb. 19, 2015 (14 pages).

(Continued)

*Primary Examiner* — Edwin A. Leon
(74) *Attorney, Agent, or Firm* — Michael Best & Friedrich LLP

(57) ABSTRACT

A battery switch including a selector supported by a housing and rotatably mounted to the housing. The selector having four positions, including, a first position in which a first and second bank terminals are disconnected from a first and second load terminals, a second position in which the first bank terminal is connected to the first load terminal and the second bank terminal is disconnected from the second load terminal, a third position in which the first bank terminal is connected to the first load terminal, the second bank terminal is connected to the second load terminal, and the first bank terminal is disconnected from the second bank terminal, and a fourth position in which the first bank terminal is connected to the first load terminal and the second bank terminal and the second bank terminal is connected to the second load terminal.

14 Claims, 14 Drawing Sheets

(56) References Cited

U.S. PATENT DOCUMENTS 6,861,594 B2     3/2005   Sadowski et al.
7,223,926 B1 *   5/2007   Gannon ................ G05G 1/082
                                                  200/11 R

OTHER PUBLICATIONS

International Preliminary Report on Patentability for PCT Application No. PCT/US2014/064822 dated May 19, 2016 (7 pages).

* cited by examiner

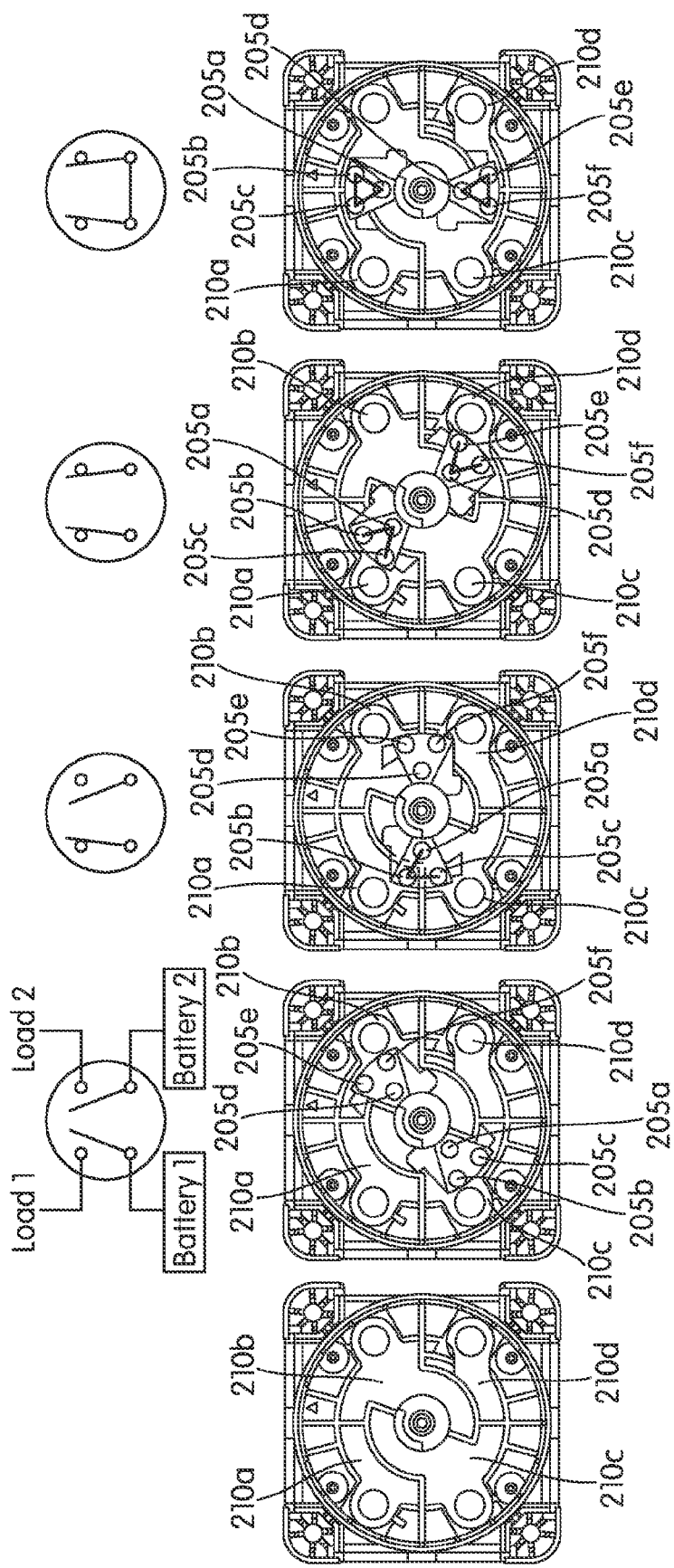

ROTARY BATTERY SWITCH

RELATED APPLICATION

The present application claims priority to U.S. Provisional Application 61/901,879, filed Nov. 8, 2013, the entire contents of which are incorporated herein by reference.

BACKGROUND

The invention relates to a battery switch, and more specifically, a battery switch for a low-voltage, direct-current (DC) electrical systems such as systems found on yachts, recreational vehicles, trucks, and other vehicles.

Vehicle systems such as yachts and recreational vehicles have become bigger; as such their DC electrical systems have evolved to meet the increased electrical power demand. Therefore, many of these electrical systems incorporate two banks of batteries. A first bank of batteries may be used for starting the engine, as well as powering other necessary engine functions, while a second bank of batteries may be isolated and used for powering non-engine related functions, such as but not limited to, heating, cooling, water pump, television, and radio.

Typically, such DC electrical systems are low-voltage, for example, six, twelve, or twenty-four volts, however, because of the significant power requirements, the DC electrical systems require high amperage conductors to be run throughout the vehicle.

SUMMARY

In one embodiment, the invention provides a battery switch configured to control a first bank of batteries and a second bank of batteries, the first and second bank of batteries having at least one battery. The battery switch includes a housing; a first bank terminal supported by the housing; a second bank terminal supported by the housing and connectable to the first bank terminal; a first load terminal supported by the housing and connectable to the first bank terminal; a second load terminal supported by the housing and connectable to the second bank terminal; and a selector supported by the housing and rotatably mounted to the housing. The selector has four positions, including, a first position in which the first and second bank terminals are disconnected from the first and second load terminals, a second position in which the first bank terminal is connected to the first load terminal and the second bank terminal is disconnected from the second load terminal, a third position in which the first bank terminal is connected to the first load terminal, the second bank terminal is connected to the second load terminal, and the first bank terminal is disconnected from the second bank terminal, and a fourth position in which the first bank terminal is connected to the first load terminal and the second bank terminal and the second bank terminal is connected to the second load terminal.

In another embodiment, the invention provides a battery switch including a housing having a removable side panel; a base; and two terminals within the housing. Each terminal has a fixed end and a free end. The two terminals extend upwardly from the base. Each free end is positioned in a space between the base and the housing. The free ends of each of the terminals are accessible by removing the side panel.

In another embodiment, the invention provides a method of selectively connecting a first bank terminal, a second bank terminal, a first load terminal, and a second load terminal. The method including selecting a first position of a rotary selector in which the first and second bank terminals are disconnected from the first and second load terminals, selecting a second position of the rotary selector in which the first bank terminal is connected to the first load terminal and the second bank terminal is disconnected from the second load terminal, selecting a third position of the rotary selector in which the first bank terminal is connected to the first load terminal, the second bank terminal is connected to the second load terminal, and the first bank terminal is disconnected from the second bank terminal, and selecting a fourth position of the rotary selector in which the first bank terminal is connected to the first load terminal and the second bank terminal and the second bank terminal is connected to the second load terminal.

Other aspects of the invention will become apparent by consideration of the detailed description and accompanying drawings.

BRIEF DESCRIPTION OF THE DRAWINGS

FIG. 17 is top view of a plurality of contact plates of the battery switch of FIG. 4A.

FIG. 18 is a top view of the plurality of contact plates of FIG. 17 in a position in which all four terminals are disconnected from one another.

FIG. 19 is a top view of the plurality of contact plates of FIG. 17 in a position in which two of the four terminals are connected to each other.

FIG. 20 is a top view of the plurality of contact plates of FIG. 17 in a position in which two terminals are connected to each other and the other two terminals are connected to each other.

FIG. 21 is a top view of the plurality of contact plates of FIG. 17 in a position in which all four terminals are connected to each other.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
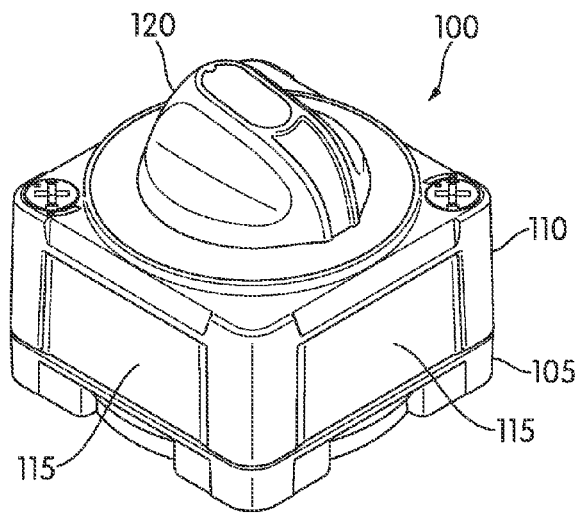
FIG. 1 is a perspective view of a battery switch according to one embodiment.
Figure 2A:
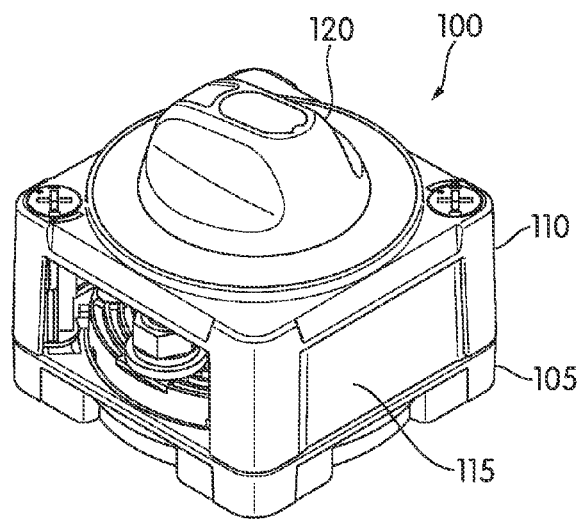
FIG. 2A is a perspective view of the battery switch of FIG. 1 having a side panel removed.
Figure 2B:
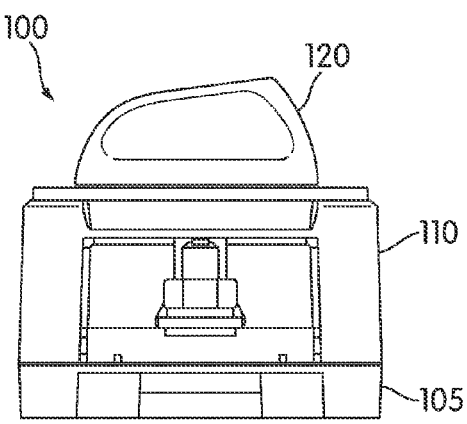
FIG. 2B is a side view of the battery switch of FIG. 2A.

FIGS. 1 and 2A-2B illustrate one embodiment of a battery switch 100. The battery switch 100 connects a first battery B1, a second battery B2, a first load L1, and a second load L2 in a plurality of configurations. The battery switch 100 includes a base 105 and a housing 110 having a plurality of side panels 115. As illustrated in FIGS. 2A and 2B, in some embodiments, the interior of the battery switch 100 is accessible by removing one or more of the side panels 115.

The battery switch 100 further includes a rotary selector, or selector knob, 120. The selector knob 120 rotates between a plurality of positions. In one embodiment, the selector knob 120 rotates between four positions described in more detail below: an off-position; a first load on-position; a first and second load on-position; and a first and second load connected in parallel position. In other embodiments, the selector knob 120 rotates between more or less positions.

Figure 3:
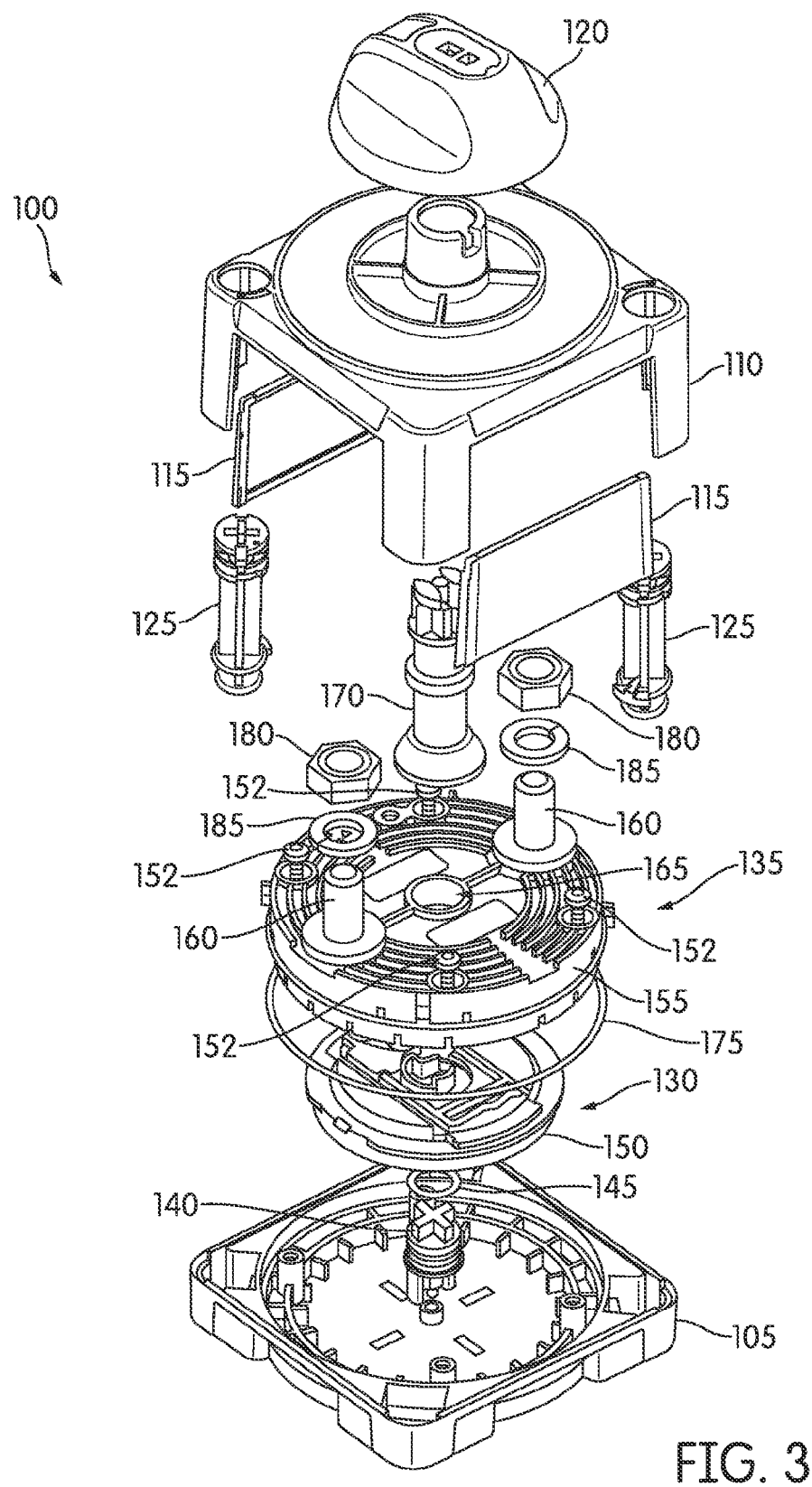
FIG. 3 is an exploded view of the battery switch of FIG. 1.

FIG. 3 is an exploded perspective view of the battery switch 100. As illustrated, the battery switch 100 may further include a plurality of fasteners 125 connecting the housing 110 to the base 105. The battery switch 100 may further include a contact carrier subassembly 130 and a terminal plate subassembly 135.

The contact carrier subassembly 130 is connected to the base 105 via a shaft, or stub shaft, 140 and, in some embodiments, a first O-ring 145. The contact carrier subassembly 130 may include a carrier plate 150. The stub shaft 140 extends through, and is non-rotatably coupled to, the carrier plate 150, such that turning of the stub shaft 140 turns the carrier plate 150 and thus the contact carrier subassembly 130.

Figure 4A:
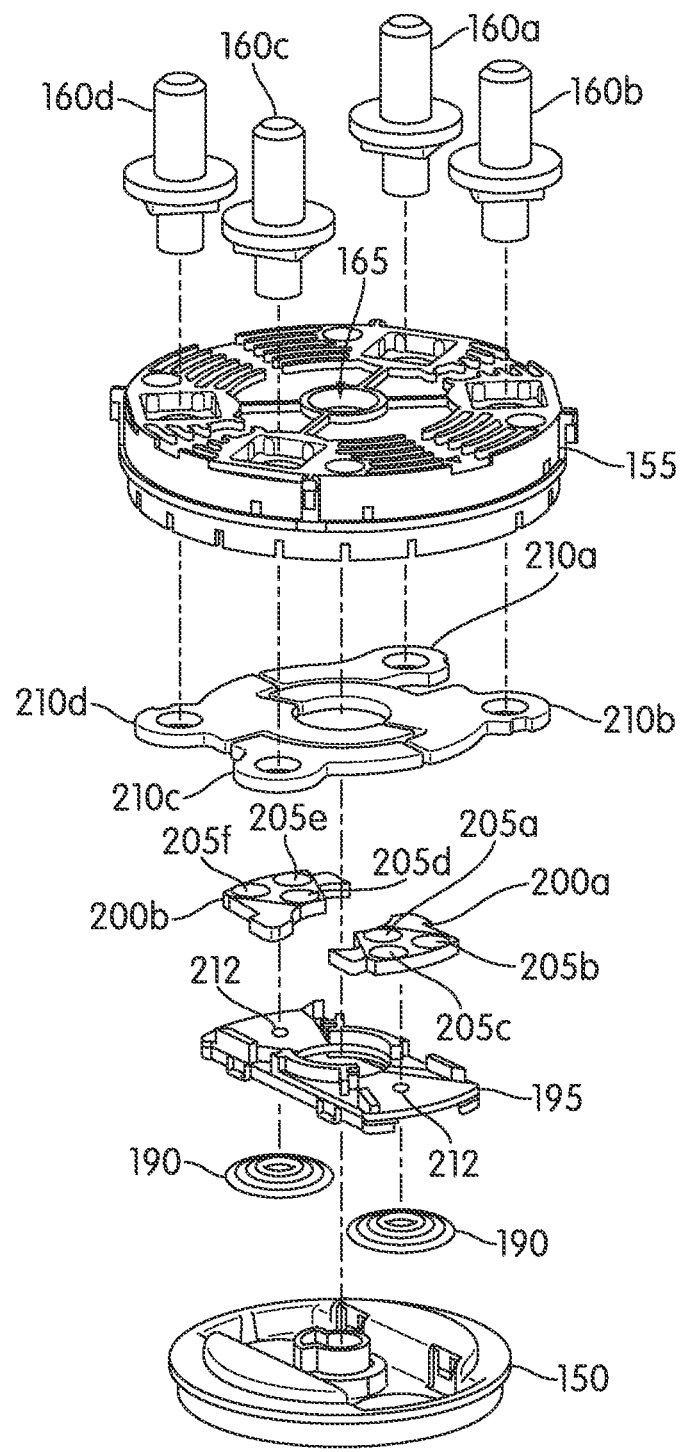
FIG. 4A is an exploded top-perspective view of a battery switch without a housing according to another embodiment.
Figure 4B:
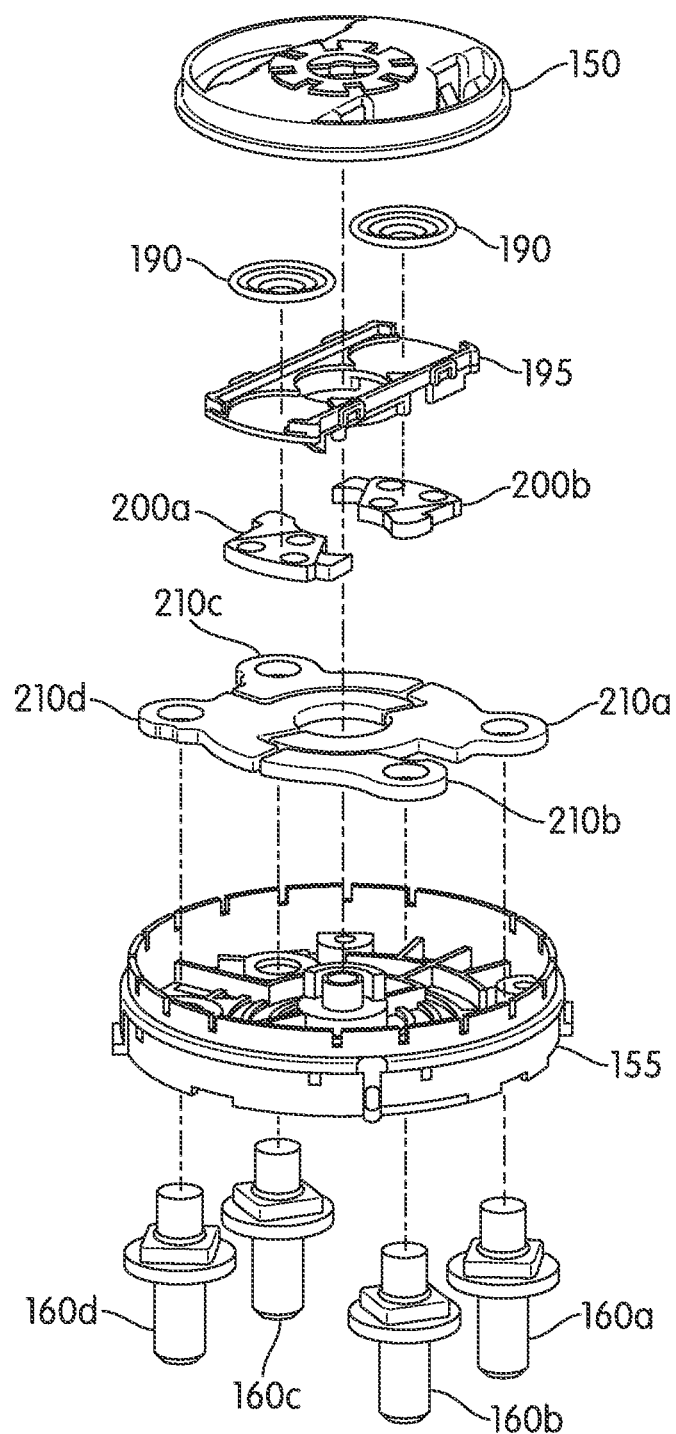
FIG. 4B is an exploded bottom-perspective view of the battery switch of FIG. 4A.
Figure 5A:
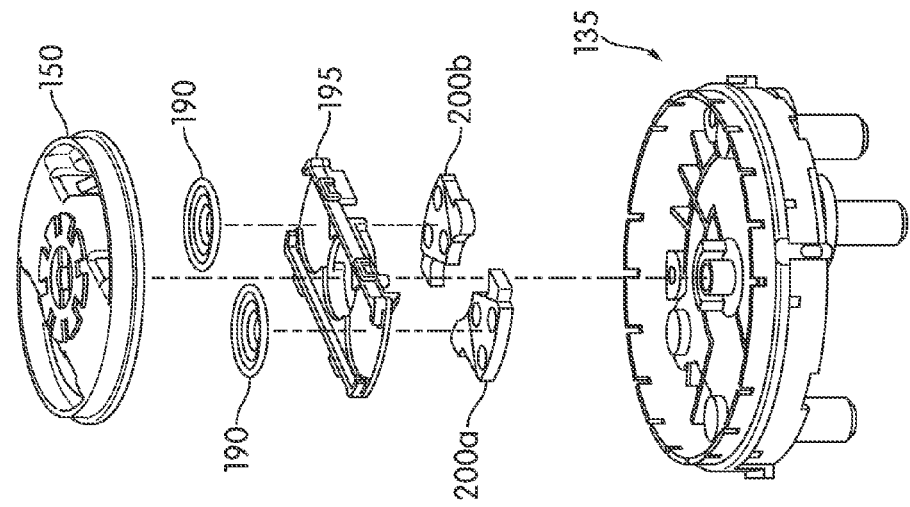
FIG. 5A is a partially exploded top-perspective view of the battery switch of FIG. 4A.
Figure 5B:
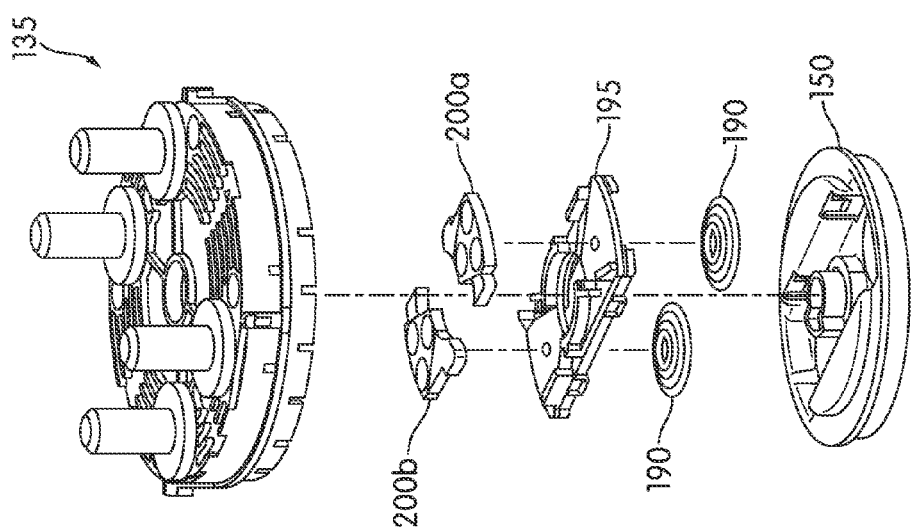
FIG. 5B is a partially exploded bottom-perspective view of the battery switch of FIG. 4A.
Figure 6B:
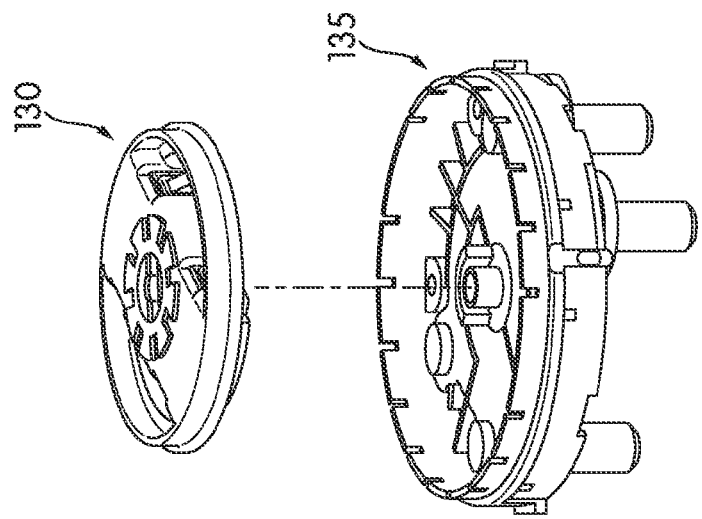
FIG. 6B is a partially exploded bottom-perspective view of the battery switch of FIG. 4A.
Figure 6A:
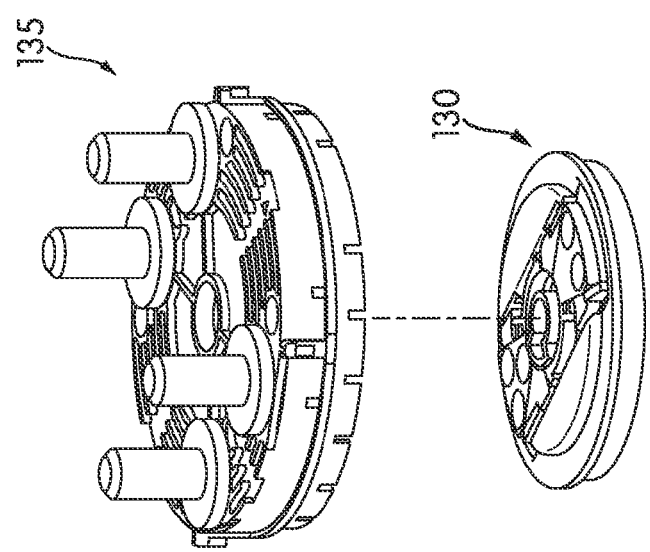
FIG. 6A is a partially exploded top-perspective view of the battery switch of FIG. 4A.

The terminal plate subassembly 135 is in rotatable contact with the contact carrier subassembly 130 and non-rotatably coupled to the base 105. In some embodiments, the terminal plate subassembly 135 is coupled to the base 105 via a plurality of second fasteners 152. The terminal plate subassembly 135 may include, among other things, a terminal plate 155 and a plurality of terminals, or terminal studs, 160 coupled to the terminal plate 155. Although illustrated as having two terminals 160, in other embodiments (for example as illustrated in FIGS. 4-6) there may be more terminals 160.

The terminal plate 155 includes an aperture 165. The stub shaft 140 extends through the aperture 165 and couples to a selector shaft 170, which is non-rotatably coupled to the selector knob 120. In some embodiments, a second O-ring 175 may be provided between the base 100 and the terminal plate 155 in order to seal against dirt and moisture. In some embodiments, the battery switch 100 may further include a plurality of third fasteners 180 and a plurality of washers 185 for securing and/or coupling the terminals 160 to an outside device (discussed in more detail below in FIG. 16). In such an embodiment, the terminals 160 may be threaded.

FIGS. 4A-6B illustrate various exploded, or partially exploded, views of the contact subassembly 130 and the terminal plate subassembly 135, including exploded top-perspective views and exploded bottom-perspective views. As illustrated, the contact carrier subassembly 130 may further include compression springs 190, a contact support plate 195, and lobed contacts 200a, 200b.

The contact support plate 195 is snap fit to the carrier plate 150 in such a manner that the contact support plate 195 floats relative to the carrier plate 150 in order to permit the compression springs 190 to be compressed. The contact support plate 195 couples to the lobed contacts 200a, 200b. The contact support plate 195 may include dimples 212, which press against the bottom side of the lobed contacts 200a, 200b in order to allow the lobed contacts 200 to rock relative to the contact support plate 195. The lobed contacts 200a, 200b may include contact lobes 205a, 205b, 205c, 205d, 205e, and 205f.

The terminal plate subassembly 135 may further include contact plates 210a, 210b, 210c, and 210d coupled to the plurality of terminals 160a, 160b, 160c, and 160d respectively. The terminals 160a-160d are inserted through the terminal plate 155 and are staked, welded, or otherwise mechanically and electrically connected to the respective contact plates 210a-210d. In some embodiments, the contact plates 210a-210d are insulated from one another via an insulation material (e.g., rubber, plastic, etc.).

When the contact subassembly 130 and the terminal plate subassembly 135 are in contact, the contact lobes 205a-205f selectively contact the bottoms of the contact plates 210a-210d. The contact of the contact lobes 205a-205f with the contact plates 210a-210d is promoted by the compression springs 190.

Figure 7A:
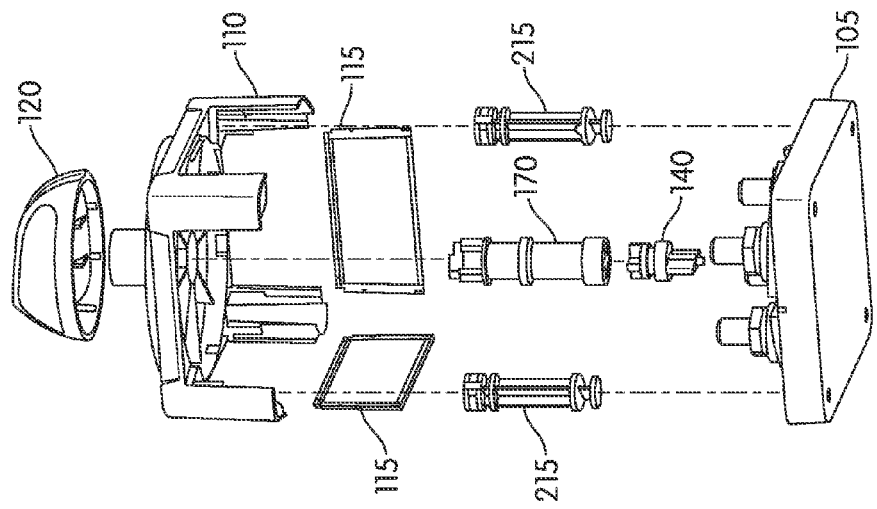
FIG. 7A is a partially exploded top-perspective view of the battery switch of FIG. 4A including the housing.
Figure 7B:
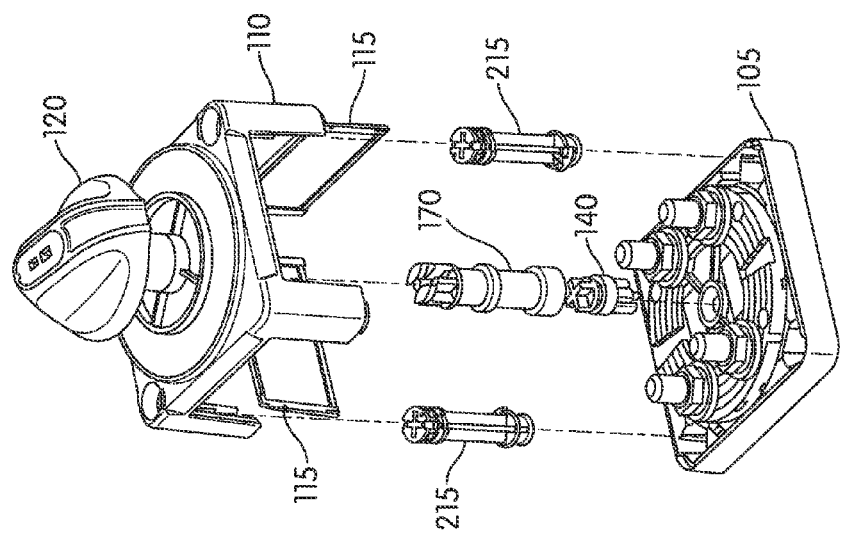
FIG. 7B is a partially exploded bottom-perspective view of the battery switch of FIG. 4A including the housing.
Figure 8:
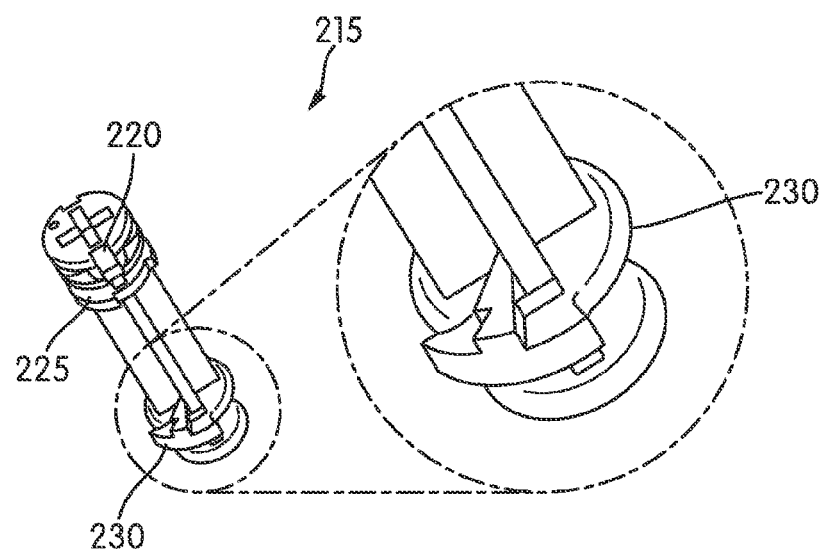
FIG. 8 is a perspective view of a fastener of the battery switch of FIG. 1 or 4A.
Figure 9:
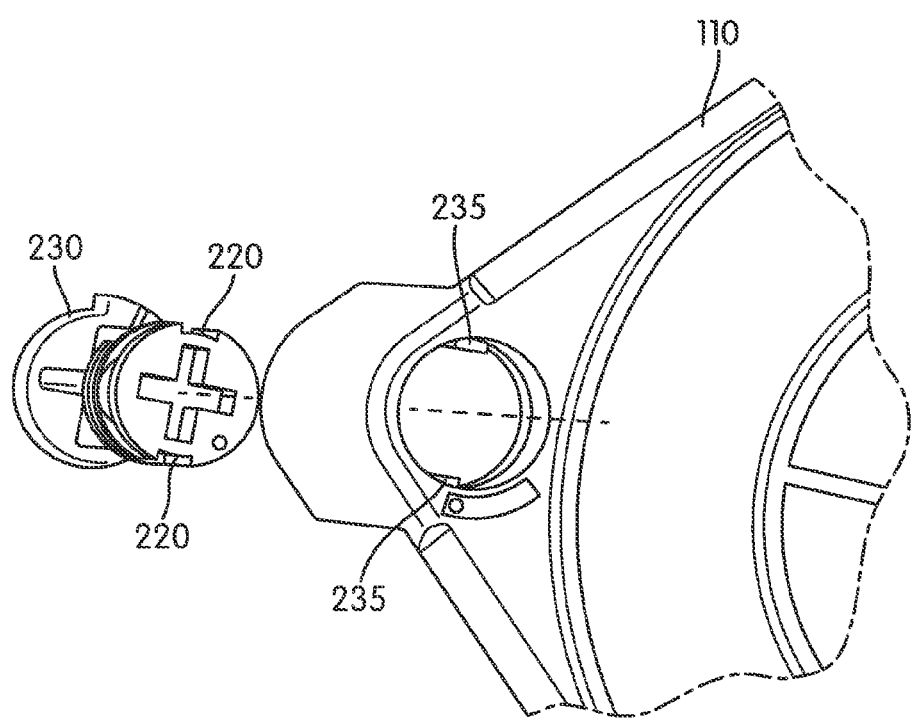
FIG. 9 is a perspective view of the fastener of FIG. 8 connecting to the housing of the battery switch of FIG. 1 or 4A.
Figure 10:
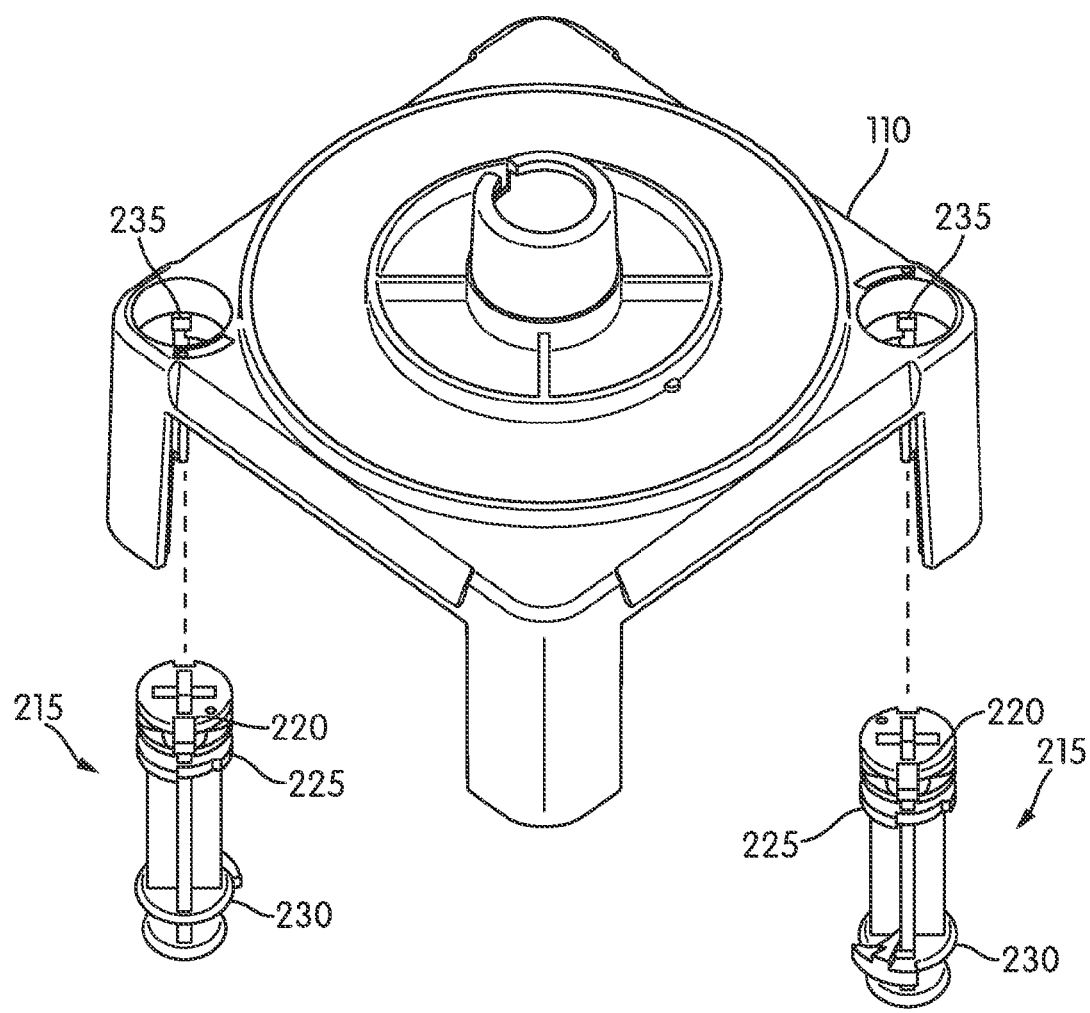
FIG. 10 is a perspective view of the housing of the battery switch of FIG. 1 or 4A receiving the fasteners of FIG. 8.

FIGS. 7A and 7B illustrate an exploded view of the battery switch 100 with the contact subassembly 130 and the terminal plate subassembly 135 coupled to the base 105. In one embodiment, as illustrated, the housing 110 is connected to the base 105 via the two or more fasteners 125 (further detailed below in FIGS. 8-14). In other embodiments, the housing 110 may be connected to the base 105 by other suitable means. As discussed above, the stub shaft 140 extends through the aperture 165 and is non-rotatably coupled to both the contact carrier subassembly 130 (located under the terminal plate subassembly 135) and the selector shaft 170. Thus, when the selector shaft 170 is turned (via the selector knob 120), the contact carrier subassembly 130 turns as well, while the terminal plate subassembly 135 maintains position.

FIGS. 8-15 illustrate connection of the one of the fasteners 125 to the base 105 and housing 110. The fastener 125 may include slots 220, grooves 225, and a ramped surface 230. The slots 220 are located at a top end of the fastener 125. The slots 220 receive keys 235 of the housing 110 and when the fastener 125 is turned clockwise, the keys 235 catch in the grooves 225 in order to secure the fastener 125 to the housing 110. The ramped surface 230 is located at a bottom end of the fastener 125 and couples the fastener 125 to the base 105. When the fastener 125 is turned clockwise, the ramped surface 230 of the fastener 125 catches on a ledge 240 of the base 105.

Figure 11:
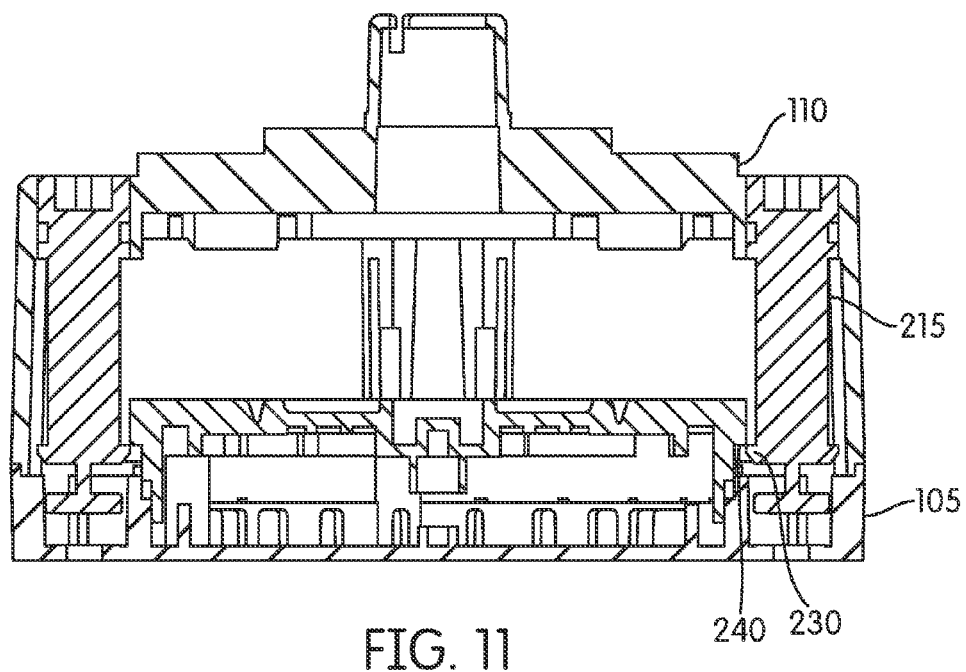
FIG. 11 is a cross-sectional view of the battery switch of FIG. 1 or 4A illustrating the fasteners in an unlocked position.
Figure 12:
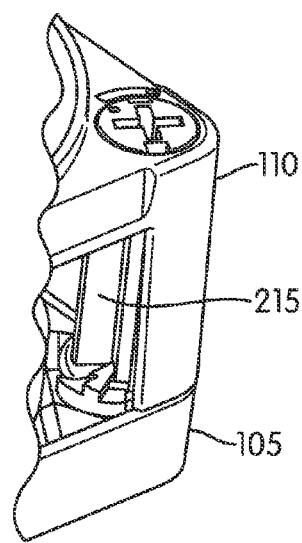
FIG. 12 is a perspective view of the housing of the battery switch of FIG. 1 or 4A illustrating the fasteners in an unlocked position.
Figure 13:
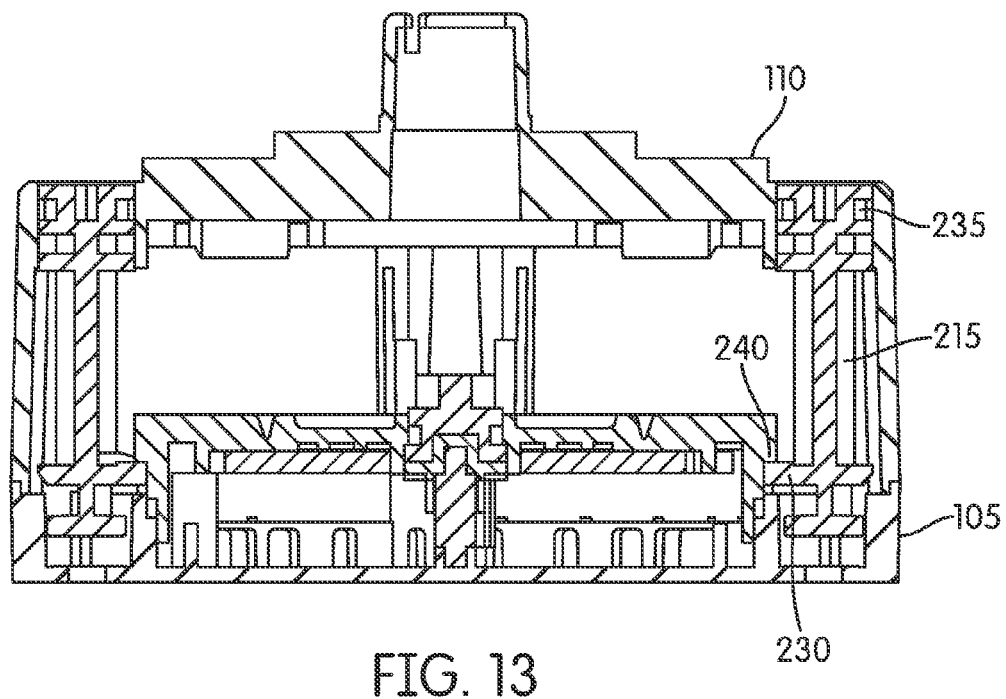
FIG. 13 is a cross-sectional view of the battery switch of FIG. 1 or 4A illustrating the fasteners in an locked position.
Figure 14:
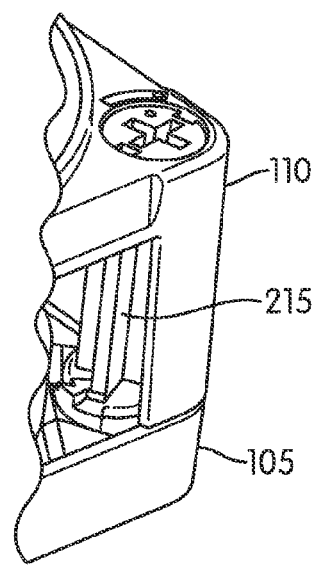
FIG. 14 is a perspective view of the housing of the battery switch of FIG. 1 or 4A illustrating the fasteners in an locked position.

FIGS. 11 and 12 illustrate the fasteners 125 in an unlocked position. In the unlocked position, keys 235 of the fasteners 125 are not caught in the grooves 225 of the housing 110 and the ramped surfaces 230 of the fasteners 125 are not caught on the ledges 240 of the base 105. FIGS. 13 and 14 illustrate the fasteners 125 in a locked position. In the locked position, keys 235 are caught in the grooves 225 and the ramped surfaces 230 are caught on the ledges 240, thereby securing the housing 110 to the base 105.

Figure 15:
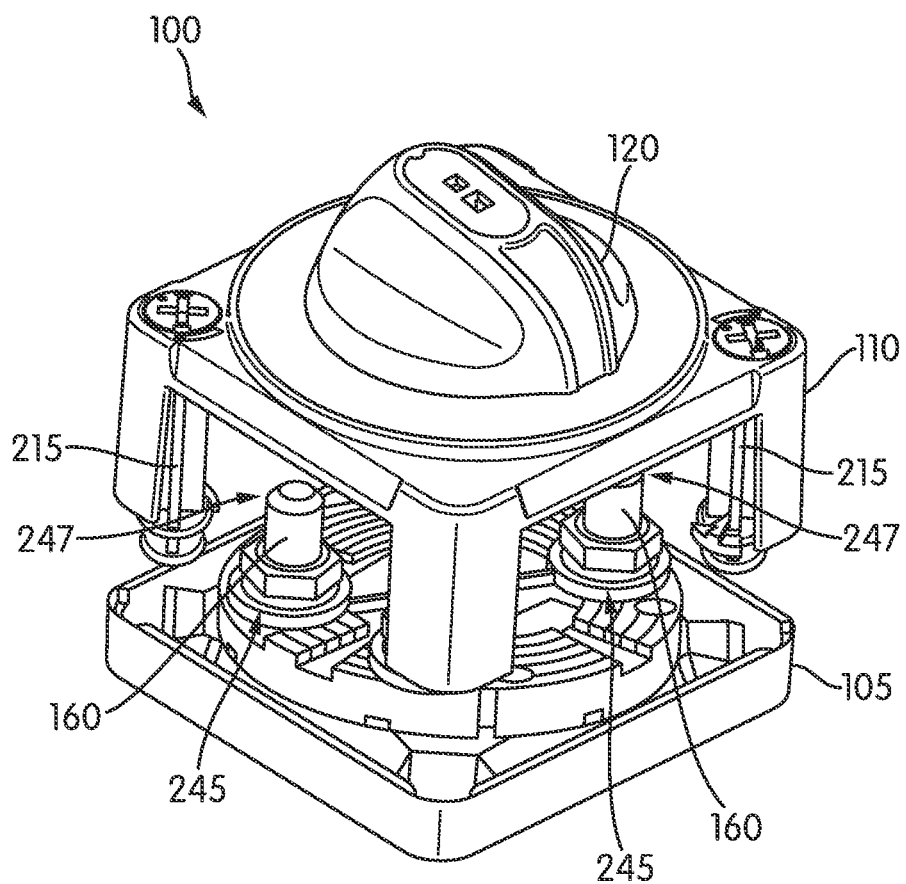
FIG. 15 is a partially exploded top-perspective view of the battery switch of FIG. 1.

FIG. 15 illustrates a partially exploded top-perspective view of the battery switch 100. As illustrated, the terminals 160 each include a fixed end 245 and a free end 247. The terminals 160 are connected to the base 105 via the fixed ends 245. The free ends 247 are located in a space between the base 105 and the housing 110. The free ends 247 of the terminals 160 are accessible by removing one or more side panels 115.

Figure 16:
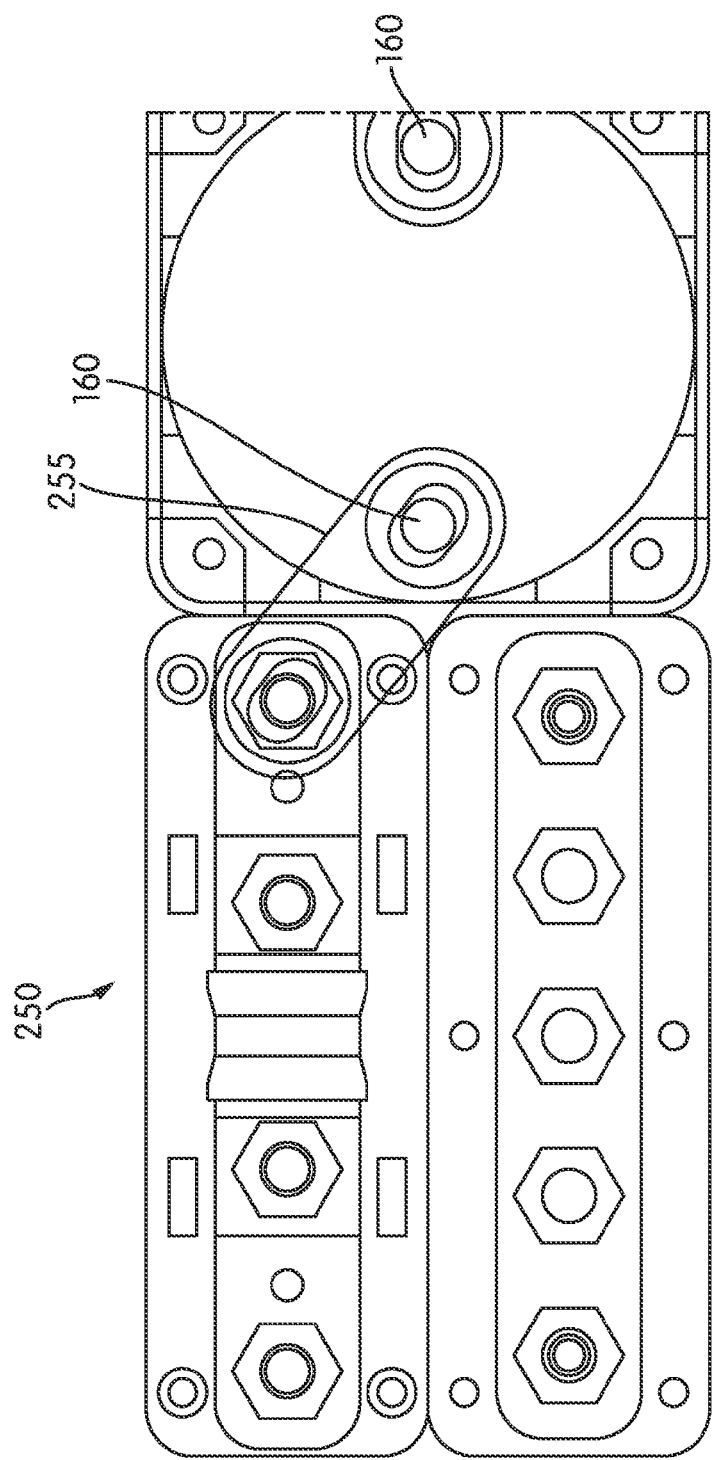
FIG. 16 is a block diagram illustrating the battery switch of FIG. 1 electrically connected to an electrical device.

FIG. 16 illustrates the battery switch 100 electrically connected to an electrical device, such as but not limited to, a fuse block 250. As discussed above, in some embodiments, the free ends 247 of the terminals 160 are accessible by removing one or more of the side panels 115. The terminals 160 are electronically connected to the fuse block 250 via a connection link 255. In some embodiments, the connection link 255 engages the terminal 160 over the top of the free ends 247 in a direction from the housing 110 to the base 105. In some embodiments, the connection link 255 is mechanically secured to the terminal 160 via the third fasteners 180 and washers 185 (FIG. 3).

FIG. 17 is a top view of the contact plates 210a, 210b, 210c, and 210d coupled to the plurality of terminals 160a, 160b, 160c, and 160d respectively, with the terminals 160a, 160b, 160c, and 160d electrically coupled to the first battery B1, the second battery B2, the first load L1, and the second load L2 respectively. In the illustrated embodiment, contact plate 210a and its corresponding terminal 160a may be identified as first load, or first load terminal, L1; contact plate 210b and its corresponding terminal 160b may be identified as second load, or second load terminal, L2; contact plate 210c and its corresponding terminal 160c may be identified as first battery, or first bank terminal, B1; and contact plate 210d and its corresponding terminal 160d may be identified as second battery, or second bank terminal, B2.

FIGS. 18-21 illustrate the various positions of operation of the battery switch 100. FIG. 18 illustrates the battery switch 100 in the off-position. In the off-position, all three lobes 205a-205c of lobed contact 200a are in contact with contact plate 210c (B1), while all three lobes 205d-205f of lobed contact 200b are in contact with contact plate 210b (L2). Therefore, there is no electrical connection between the first load L1, the second load L2, the first battery B1, and the second battery B2.

FIG. 19 illustrates the battery switch 100 in the first load on-position (i.e., L1 is electrically connected to B1). Upon turning the knob 120 forty-five degrees from the off-position, the battery switch 100 is placed in the first load on-position with the first load L1 being electrically connected to the first battery B1. As illustrated, when in the first load on-position, lobe 205b is in contact with contact plate 210a (L1), while lobes 205a and 205c are in contact with contact plate 210c (B1). Additionally, all three lobes 205d-205f are in contact with contact plate 210b (L2). Therefore, the first load L1 and the first battery B1 are electrically connected, while there is no electrical connection between the second load L2 and the second battery B2.

FIG. 20 illustrates the battery switch 100 in the first and second load on-position (i.e., L1 is electrically connected to B1 and L2 is electrically connected to B2). Upon turning the knob 120 forty-five degrees from the first load on-position, the battery switch 100 is placed in the first and second load on-position. As illustrated, when in the first and second load on-position, lobes 205b and 205c are in contact with contact plate 210a (L1), while lobe 205a is in contact with contact plate 210c (B1). Additionally, lobes 205d and 205f are in contact with contact plate 210d (B2), while lobe 205e is in contact with contact plate 210b (L2). Therefore, the first load L1 is electrically connected to the first battery B1 and the second load L2 is electrically connected to the second battery B2.

FIG. 21 illustrates the battery switch 100 in the first and second load connected in parallel position (i.e., L1 and L2 are connected in parallel with B1 and B2). Upon turning the knob 120 forty-five degrees from the first and second load on-position, the battery switch 100 is placed in the first and second load connected in parallel position. As illustrated, when in the first and second load connected in parallel position, lobe 205c is in contact with contact plate 210a (L1), lobe 205b of lobed contact 200a and lobe 205d of lobed contact 200b are in contact with contact plate 210b (L2), lobe 205a of lobed contact 200a and lobe 205f of lobed contact 200b are in contact with contact plate 210c (B1), and lobe 205e is in contact with contact plate 210d (B2). Therefore, the first load L1 and the second load L2 are connected in parallel with the first battery B1 and the second battery B2.

Thus, the invention provides, among other things, a battery switch configured to control a first bank of batteries and a second bank of batteries, the first and second bank of batteries having at least one battery. Various features and advantages of the invention are set forth in the following claims.

What is claimed is:

1. A battery switch configured to control a first bank of batteries and a second bank of batteries, the first and second bank of batteries having at least one battery, the battery switch comprising:
   a housing;
   a first bank terminal supported by the housing;
   a second bank terminal supported by the housing and connectable to the first bank terminal;
   a first load terminal supported by the housing and connectable to the first bank terminal;
   a second load terminal supported by the housing and connectable to the second bank terminal; and
   a selector supported by the housing and rotatably mounted to the housing, the selector having four positions including
      a first position in which the first and second bank terminals are disconnected from the first and second load terminals,
      a second position in which the first bank terminal is connected to the first load terminal and the second bank terminal is disconnected from the second load terminal,
      a third position in which the first bank terminal is connected to the first load terminal, the second bank terminal is connected to the second load terminal, and the first bank terminal is disconnected from the second bank terminal, and a fourth position in which the first bank terminal is connected to the first load terminal and the second bank terminal and the second bank terminal is connected to the second load terminal.

2. The battery switch of claim 1, wherein the battery switch is electrically connected to at least one selected from the group of the first bank of batteries, the second bank of batteries, a first load, and a second load via a connection link.

3. The battery switch of claim 1, wherein each of the terminals are connected to a corresponding fixed contact plate.

4. The battery switch of claim 3, wherein the corresponding fixed contact plates are arranged in a generally circular pattern and are insulated from one another.

5. The battery switch of claim 3, wherein the corresponding fixed contact plates include at least two movable contacts that are insulated from one another and are movable relative to the contact plates by operating the selector.

6. The battery switch of claim 5, wherein each movable contact has three points of electrical contact.

7. The battery switch of claim 1, wherein the bank terminals and the load terminals extend upwardly from a fixed end connected to a base of the switch to a free end below a housing of the switch.

8. The battery switch of claim 1, wherein the housing includes at least one removable side.

9. The battery switch of claim 8, wherein the removable side provides access to at least one selected from the group of the first bank terminal, the second bank terminal, the first load terminal, and the second load terminal.

10. A method of selectively connecting a first bank terminal, a second bank terminal, a first load terminal, and a second load terminal, the method comprising:
selecting a first position of a rotary selector in which the first and second bank terminals are disconnected from the first and second load terminals;
selecting a second position of the rotary selector in which the first bank terminal is connected to the first load terminal and the second bank terminal is disconnected from the second load terminal;
selecting a third position of the rotary selector in which the first bank terminal is connected to the first load terminal, the second bank terminal is connected to the second load terminal, and the first bank terminal is disconnected from the second bank terminal; and
selecting a fourth position of the rotary selector in which the first bank terminal is connected to the first load terminal and the second bank terminal and the second bank terminal is connected to the second load terminal.

11. The method of claim 10, further providing two contact plates arranged in a generally circular pattern and insulated from one another.

12. The method of claim 11, wherein the contact plates include at least two movable contacts that are insulated from one another and are movable relative to the contact plates by operating the selector.

13. The method of claim 12, wherein each movable contact has three points of electrical contact.

14. The method of claim 10, wherein the bank terminals and the load terminals extend upwardly from a fixed end connected to a base to a free end below a housing.

* * * * *